(12) United States Patent
Abe

(10) Patent No.: US 7,988,221 B2
(45) Date of Patent: Aug. 2, 2011

(54) MOUNTING STRUCTURE OF IMPACT ABSORBING MEMBER AND METHOD OF MOUNTING SAME

(75) Inventor: Keita Abe, Hiratsuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 12/687,041

(22) Filed: Jan. 13, 2010

(65) Prior Publication Data

US 2010/0109379 A1  May 6, 2010

Related U.S. Application Data

(62) Division of application No. 12/044,510, filed on Mar. 7, 2008, now Pat. No. 7,695,051.

(30) Foreign Application Priority Data

Apr. 6, 2007 (JP) ................................ 2007-100528

(51) Int. Cl.
*B60J 5/00* (2006.01)
(52) U.S. Cl. ............ 296/187.03; 296/187.12; 296/146.6
(58) Field of Classification Search ............. 296/187.03, 296/187.12, 146.6; 49/502
See application file for complete search history.

(56) References Cited

U.S. PATENT DOCUMENTS

| 5,395,135 A | 3/1995 | Lim et al. | |
|---|---|---|---|
| 5,447,326 A * | 9/1995 | Laske et al. | 280/728.3 |
| 6,447,047 B1 * | 9/2002 | Marcovecchio et al. | 296/146.7 |
| 2001/0017476 A1 * | 8/2001 | Nishikawa et al. | 296/146.6 |
| 2007/0046073 A1 | 3/2007 | Ludwig et al. | |

FOREIGN PATENT DOCUMENTS

| EP | 1129873 A2 | 9/2001 |
|---|---|---|
| JP | 2005-138838 | 6/2005 |

OTHER PUBLICATIONS

Patent Abstracts of Japan publication No. 2005-138838, published Jun. 2, 2005 (1 page).
European Search Report in Application No. 08154073.4-1523, dated Jan. 12, 2011 (5 pages).

\* cited by examiner

*Primary Examiner* — Dennis H Pedder
(74) *Attorney, Agent, or Firm* — Osha Liang LLP

(57) ABSTRACT

An impact-absorbing member to be installed in a vehicle body component includes a main body positioned on an inner panel of the vehicle body component such that a portion of the main body is adjacent to an outboard surface of the inner panel, and a mount protruding from the main body to an opening in the inner panel such that the mount is adjacent to an inboard surface of the inner panel, wherein the impact-absorbing member is secured by gripping an edge portion of the inner panel surrounding the opening between the mount adjacent to the inboard surface and the portion of the main body adjacent to the outboard surface.

11 Claims, 11 Drawing Sheets

MOUNTING STRUCTURE OF IMPACT ABSORBING MEMBER AND METHOD OF MOUNTING SAME

CROSS-REFERENCE TO RELATED APPLICATIONS

The present application claims priority from Japanese Patent Application No. 2007-100528, filed Apr. 6, 2007, the contents of which are hereby incorporated by reference in their entirety. Further, this application, pursuant to 35 U.S.C. §120, claims benefit to U.S. patent application Ser. No. 12/044,510, filed Mar. 7, 2008, the contents of which are hereby incorporated by reference in their entirety.

BACKGROUND OF THE DISCLOSURE

1. Field of the Disclosure

The present disclosure relates to a mounting structure of an impact-absorbing member installed between body components (e.g., an inner panel and an outer panel) of a vehicle. Further, the present disclosure relates to a method of mounting an impact-absorbing members between body components.

2. Description of the Related Art

Japanese Laid-Open Patent Application No. 2005-138838 discloses a structure configured and method to install an impact-absorbing member inside a vehicle side door to improve the door's ability to absorb impact in the event of a side surface crash. The disclosed impact-absorbing member is configured to be pressed in so that it protrudes from an interior side of an opening in an inner door panel toward an outer door panel. Further, the impact-absorbing member is disclosed as being mounted from the vehicle interior side on the inner door panel using a clip and a mounting portion installed there around.

However, during installation, the above mounting structure must be held in place so that the impact-absorbing member will not detach from the opening when a clip being press-fit from the inside of the vehicle is installed thereto. Thus, the mounting operation may be excessively complicated.

SUMMARY OF THE CLAIMED SUBJECT MATTER

In one aspect, the present disclosure relates to impact-absorbing member to be installed in a vehicle body component including a main body positioned on an inner panel of the vehicle body component such that a portion of the main body is adjacent to an outboard surface of the inner panel, and a mount protruding from the main body to an opening in the inner panel such that the mount is adjacent to an inboard surface of the inner panel, wherein the impact-absorbing member is secured by gripping an edge portion of the inner panel surrounding the opening between the mount adjacent to the inboard surface and the portion of the main body adjacent to the outboard surface.

In another aspect, the present disclosure relates to a method to mount an impact absorbing member including inserting the impact-absorbing member into a cavity formed between an inner panel and an outer panel through an opening in the inner panel, positioning a portion of a main body of the impact-absorbing member adjacent to an outboard side of the inner panel in the opening while protruding a plurality of mounts from the opening toward an inboard side of the inner panel, and securing the impact-absorbing member by retaining an edge of the opening between the portion of the main body adjacent to the outboard side of the inner panel and at least one of the plurality of mounts adjacent to the inboard side of the inner panel.

In another aspect, the present disclosure relates to an impact-absorbing member to be installed in a vehicle body component including a body means positioned on an inner panel of the vehicle body component such that a portion of the body means is adjacent to an outboard surface of the inner panel, and a mounting means protruding from the body means to an opening in the inner panel such that the mounting means is adjacent to an inboard surface of the inner panel, wherein the impact-absorbing member is secured by gripping an edge portion of the inner panel surrounding the opening between the mounting means adjacent to the inboard surface and the portion of the body means adjacent to the outboard surface.

In another aspect, the present disclosure relates to an impact-absorbing member to be installed in an opening of an inner panel of a vehicle, the impact-absorbing member including a main body and a plurality of mounts protruding from the main body, wherein the impact-absorbing member is configured to be secured to the opening by gripping an edge portion of the opening between a portion of the main body adjacent to an outboard side of the inner panel and the plurality of mounts protruding adjacent to an inboard side of the inner panel.

BRIEF DESCRIPTION OF DRAWINGS

Features of the present disclosure will become more apparent from the following description in conjunction with the accompanying drawings.

DETAILED DESCRIPTION

Figure 1:
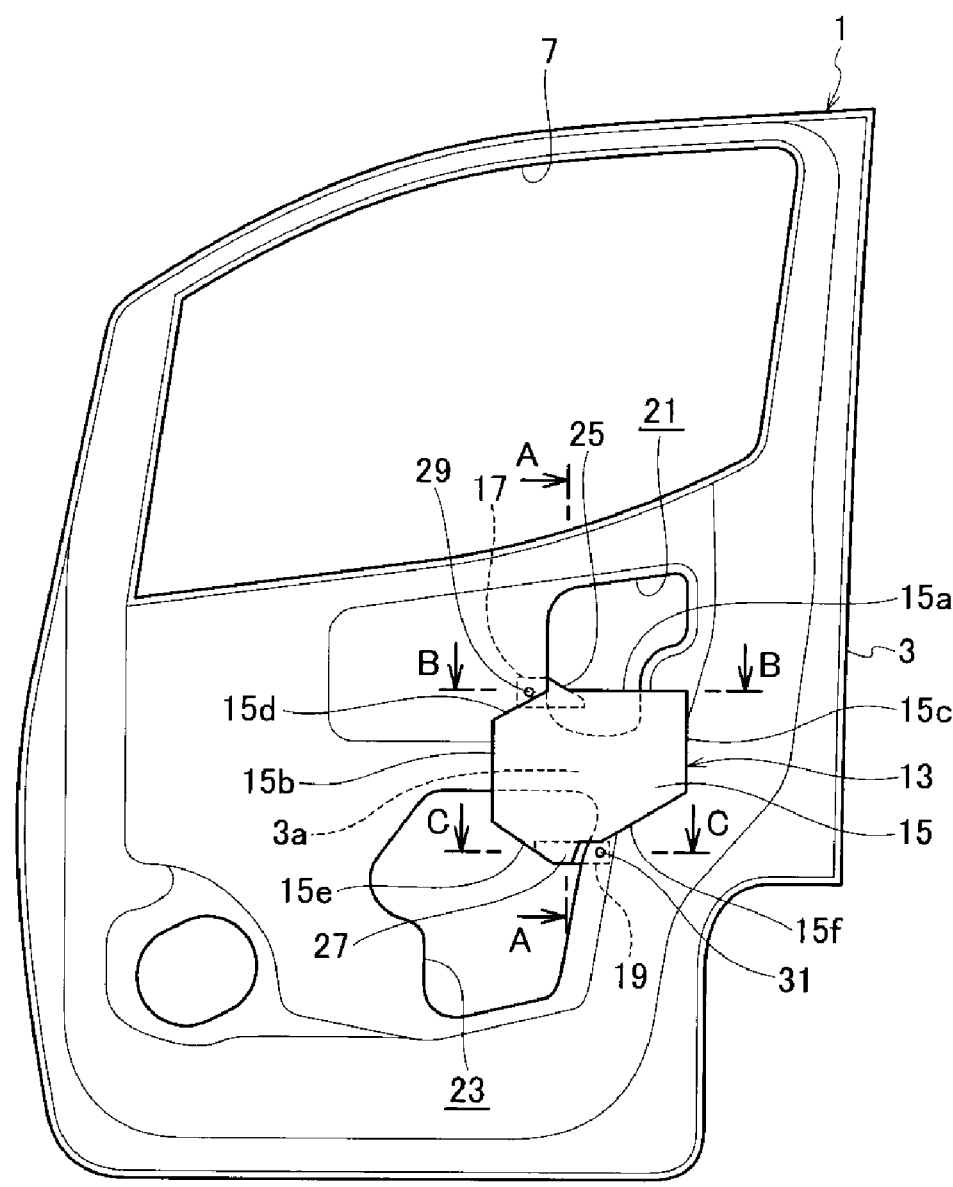
FIG. 1 depicts a front view of an inner panel viewed from a vehicle exterior side of a front side door of a vehicle showing a structure to mount an impact-absorbing member in accordance with a first embodiment of the present disclosure.

Referring initially to FIG. 1, a view of an inner panel 3 for a vehicle front side door (i.e., the left side) 1 is shown. Inner panel 3 depicts a structure to mount an impact-absorbing members in accordance with a first embodiment of the present disclosure. Similarly, FIG. 2 depicts a cross-sectional view of front side door 1 corresponding to a cross-section taken along the line A-A of FIG. 1.

Figure 2:
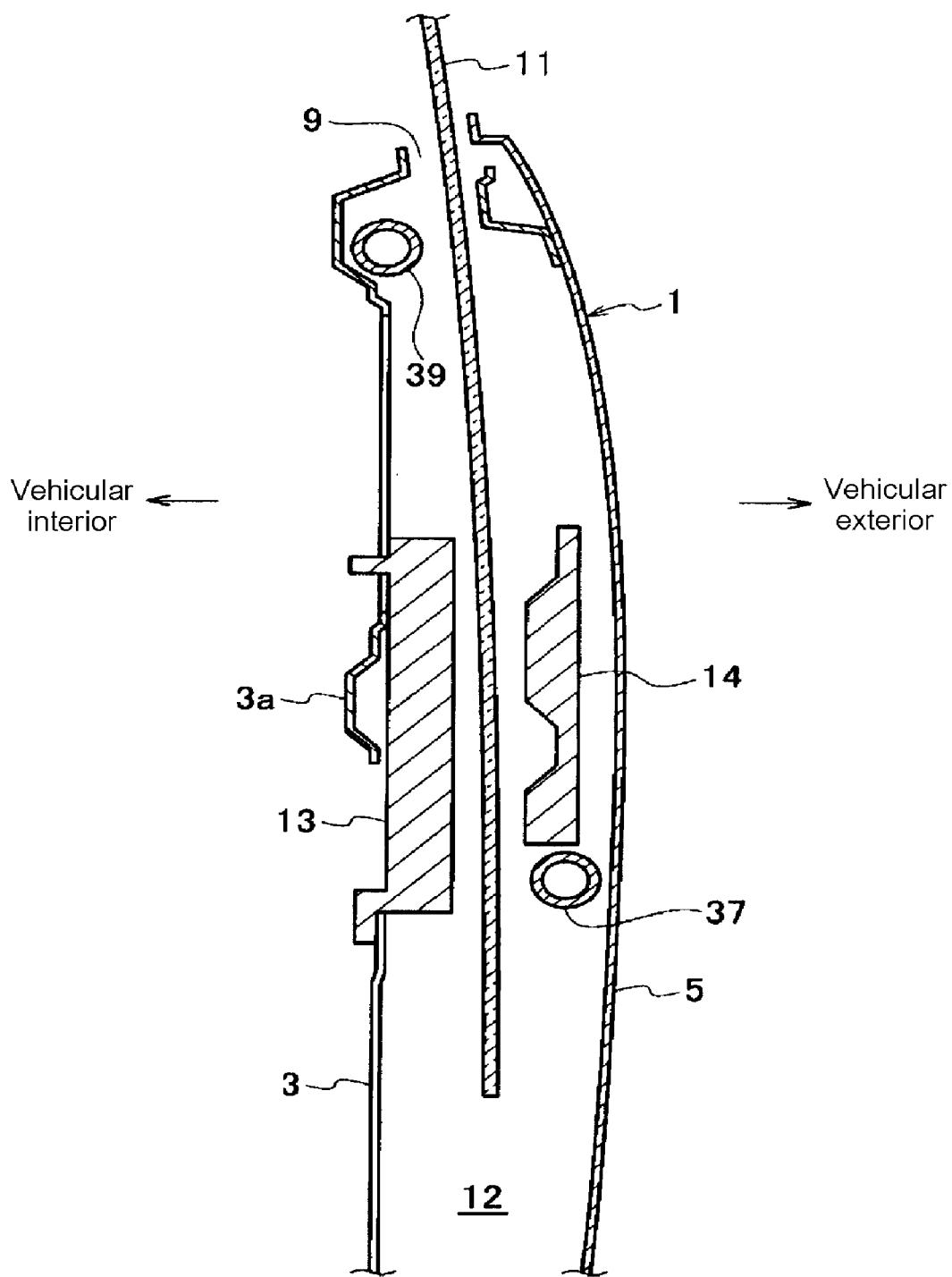
FIG. 2 is a cross-sectional view of the front side door of FIG. 1 taken along the line A-A.

Front side door 1 includes vehicular components at a vehicular side portion, (i.e., inner panel 3 and an outer panel 5) as shown in FIG. 2. Between inner and outer panels 3 and 5, front side door 1 forms a cavity 12 wherein a door glass panel 11 may be inserted from an opening 9 at an upper portion when a window 7 (shown in FIG. 1) is opened.

An inner side pad 13 configured to act as an impact-absorbing member may be installed between inner panel 3 and door glass 11 when it is inserted into the cavity 12. Further, an outer side pad 14 configured to act as an impact-absorbing member may also be installed between door glass 11 and outer panel 5. The impact-absorbing inner side pad 13 and outer side pad 14 may, for example, be formed of synthetic resin foam or any other material known to have impact-absorbing characteristics by those having ordinary skill.

Figure 3:
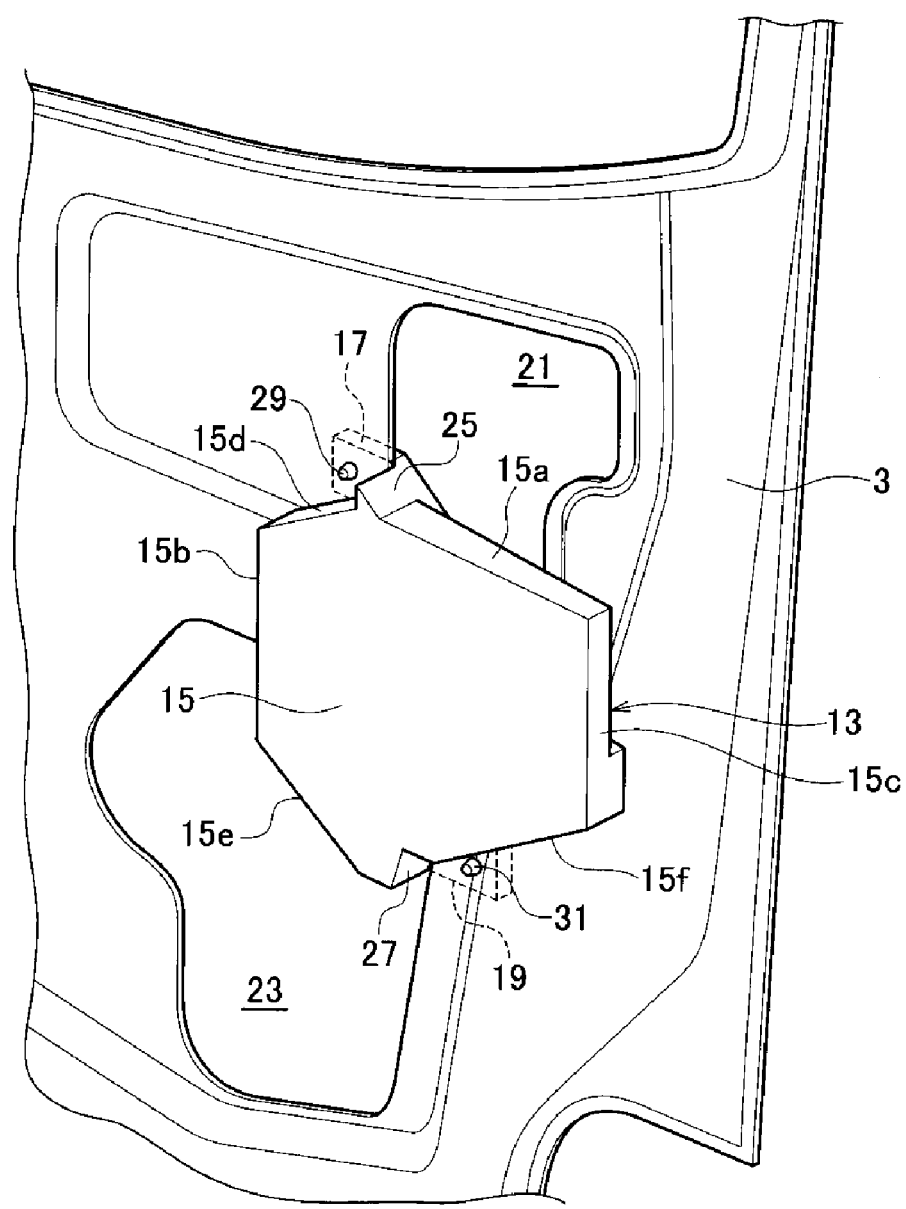
FIG. 3 is a perspective view of the inner panel located around the impact-absorbing inner side pad viewed from the vehicle exterior side.
Figure 4:
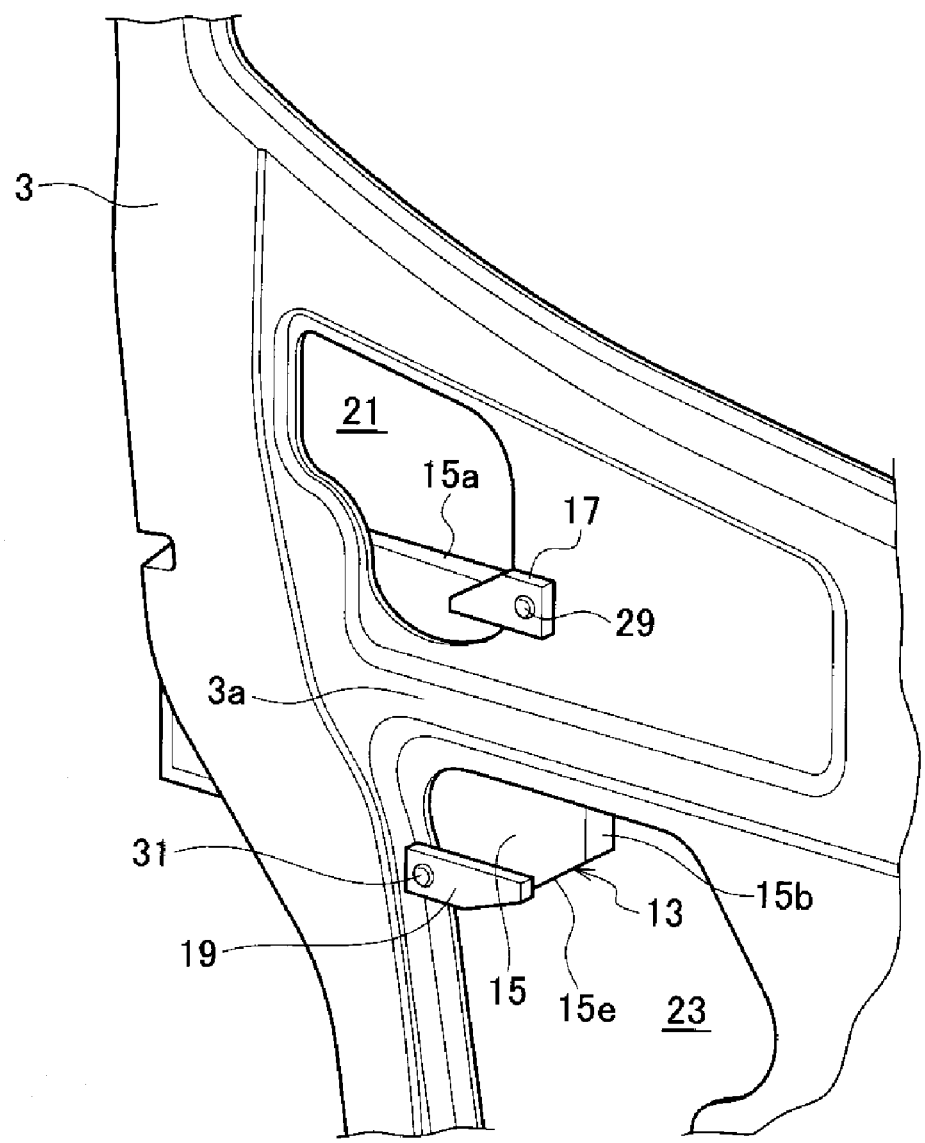
FIG. 4 is a perspective view of the inner panel around the impact-absorbing inner side pad viewed from the vehicle interior side.

As shown in FIG. 3 (a perspective view of inner panel 3 when viewed from the vehicle exterior direction) and FIG. 4 (a perspective view of inner panel 3 when viewed from the vehicle interior direction), impact-absorbing inner side pad 13 may comprise a main body 15 and mounts 17 and 19 at two (or more) locations. As shown, main body 15 may be installed on an outboard side (i.e., on the side facing outer panel 5 toward the outside of the vehicle) of inner panel 3, but it would be understood by those having ordinary skill that main body 15 may be installed on an inboard side of panel 3. While mounts 17 and 19 are shown integrally formed with main body 15, protruding toward the inboard side of inner panel 3, and spaced apart to upper and lower regions of inner panel 3, it should be understood that other configurations may be used.

Furthermore, inner panel 3 comprises openings 21 and 23 at two locations corresponding to upper and lower portions of impact-absorbing inner side pad 13 mounted on inner panel 3. When mounted, an upper portion of main body 15 may cover a portion of opening 21 and a lower portion of the main body 15 may cover a portion of opening 23.

Main body 15 of impact-absorbing inner side pad 13 may be formed as a generally plate-shape body. As shown, main body 15 comprises an upper edge 15a extending from front to rear, a front edge 15b, a rear edge 15c, an upper inclined edge 15d extending between upper edge 15a and front edge 15b, a forward lower inclined edge 15e extending from front edge 15b toward the rear direction, and a rear lower inclined edge 15f extending from rear edge 15c toward the forward direction. As such, main body 15 may generally be formed in an approximately hexagonal shape. However, those having ordinary skill should appreciate that various shapes and sizes for main body 15 of impact-absorbing inner side pad 13 may be used.

Further, as shown in FIG. 3, a protrusion 25 may extend upwardly at a boundary portion between upper edge 15a and upper inclined edge 15d. As such, mount 17 may protrude in a horizontal direction toward front edge 15b from an end of protrusion 25 on an inboard (i.e., facing the vehicle interior) side of inner panel 3. Thus, mount 17 may be placed adjacent to the vehicle interior side surface of the inner panel 3 while main body 15 is located in cavity 12 adjacent to the vehicle exterior side of inner panel 3.

Similarly, mount 19 may protrude in a horizontal direction toward rear edge 15c side from an end of a corner portion 27 located between forward lower inclined edge 15e and rear lower inclined edge 15f on an inboard side of inner panel 3. As such, similar to mount 17, the mount 19 is placed adjacent to the vehicle interior side surface of inner panel 3 while main body 15 is located in cavity 12 adjacent to the vehicle exterior side of inner panel 3.

Also, as described above, when mounted on inner panel 3, main body 15 may be positioned such that an upper portion of main body 15 covers a portion of opening 21 and a lower portion of main body 15 covers a portion of opening 23. Further, the remaining portions of main body 15 (aside from those covering openings 21 and 23) may be adjacent to a surface on the outboard (i.e., facing the vehicle exterior) side of inner panel 3 including a region 3a extending between openings 21 and 23.

Figure 5:
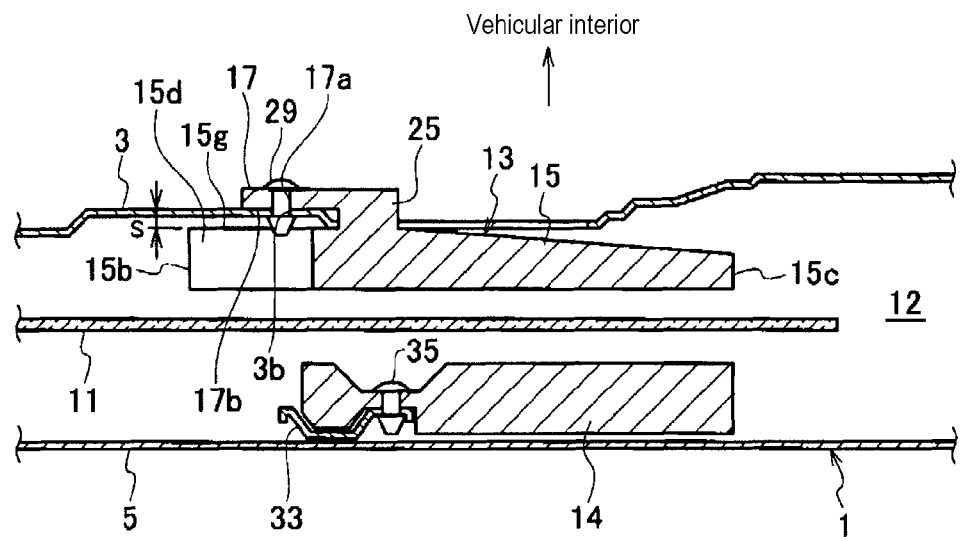
FIG. 5 is a cross-sectional view of the front side door of FIG. 1 taken along the line B-B.
Figure 6:
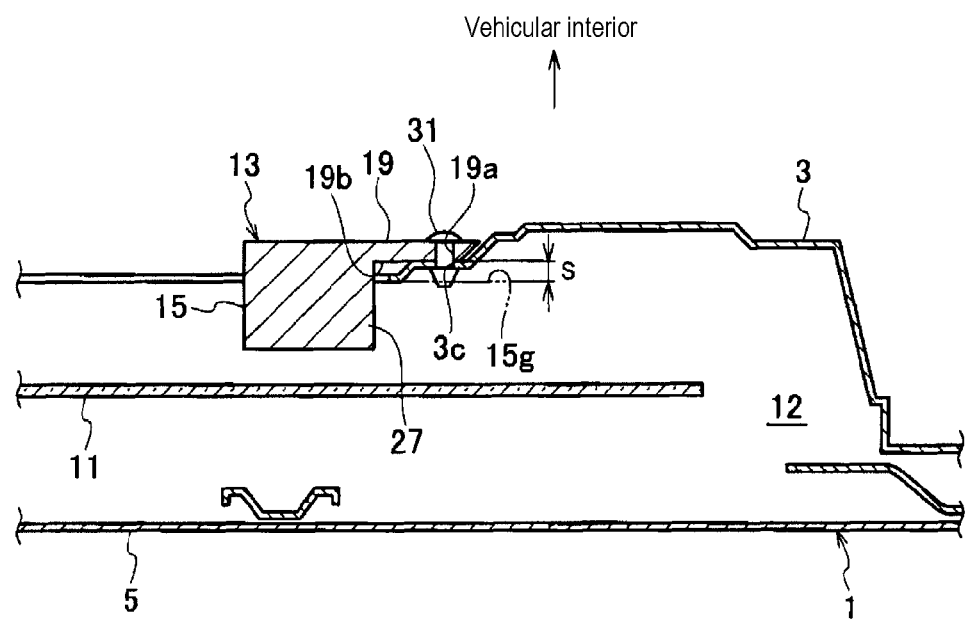
FIG. 6 is a cross-sectional view of a front side door of FIG. 1 taken along the line C-C.

Further, as shown in FIG. 5, which is a cross-sectional view of the front side door 1 taken along the line B-B of FIG. 1, mount 17 may be fixed to inner panel 3 by inserting a fastener 29 from the vehicle interior side into a through hole 17a of mount 17 and a corresponding through hole 3b of inner panel 3. Likewise, as shown in FIG. 6, which is a cross-sectional view of the front side door 1 taken along the line C-C of FIG. 1, mount 19 may be fixed to inner panel 3 by inserting a fastener 31 from the vehicle interior side into a through hole 19a of mount 19 and a corresponding through hole 3c of inner panel 3. As such, fasteners 29 and 31 may be of any type or configuration known to act as mounting elements by those having ordinary skill including, but not limited to, clips, rivets, screws, brads, tacks, welds, and the like.

Also, as shown in FIG. 5, impact-absorbing outer side pad 14 may be mounted from the vehicle interior side to a mount 33 using a similar fastener 35 wherein mount 33 is fixed to an inboard side of outer panel 5.

Additionally, front side door 1 may be reinforced with guard beams 37 and 39 extending along a longitudinal (i.e., front-to-rear) vehicular direction below a lower portion of outer side pad 14 and above inner side pad 13, as shown in FIG. 2, respectively.

Next, a method to mount impact-absorbing members having the above mounting structure will be explained with reference to FIGS. 7 to 9. Contrary to FIG. 1 (which shows inner panel 3 from outside the vehicle), it should be understood that FIGS. 7-9 depict inner panel 3 when viewed from the inside of the vehicle.

Figure 7:
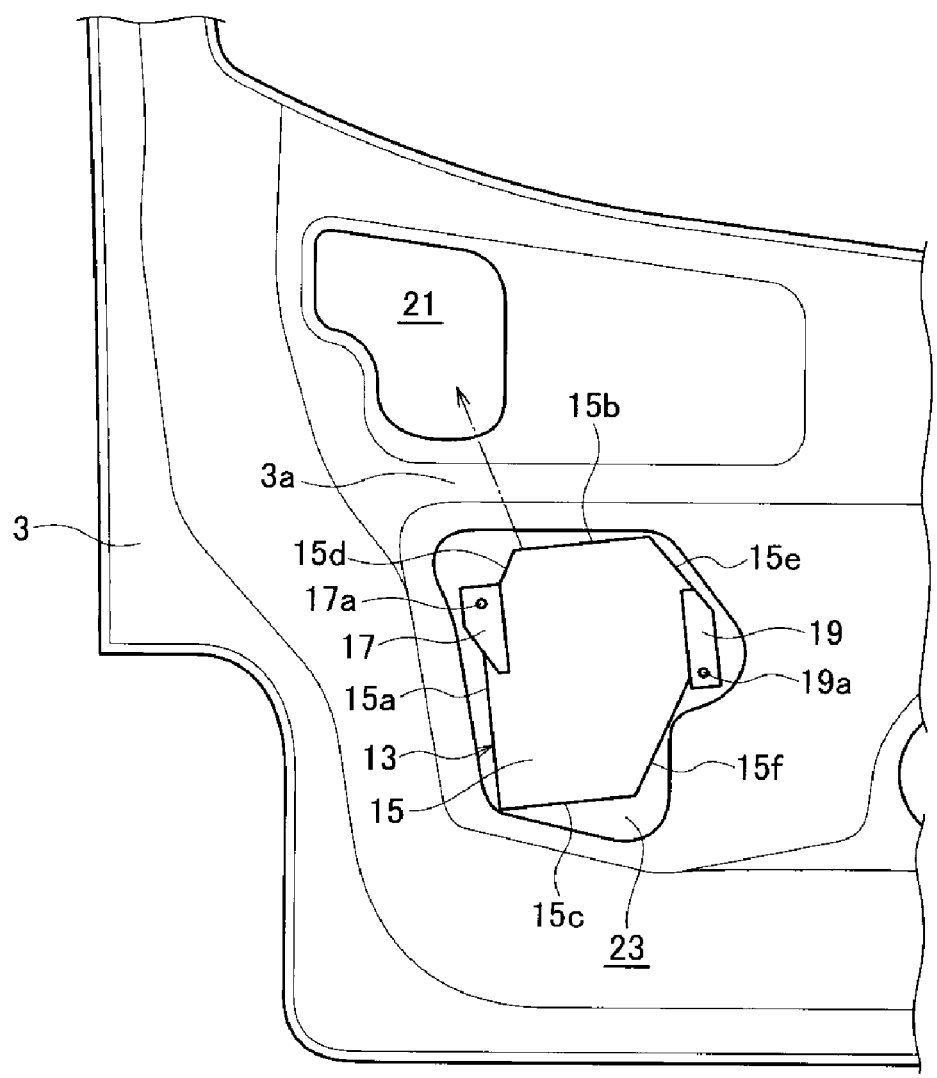
FIG. 7 is an explanatory interior-side view of an operation showing a method of mounting the impact-absorbing member by inserting it into an opening of the vehicle side door.

First, as shown in FIG. 7, inner side pad 13 (i.e., the impact-absorbing member) may be inserted from the vehicle interior side (in a direction into the a plane of the paper) via opening 23 at the lower portion of door 1 into cavity 12 between inner panel 3 and outer panel 5. Because inner side pad 13 may be inserted by being engaged into cavity 12 when a surface of main body 15 is substantially parallel to the surface of inner panel 3, the size of opening 23 may be established such that the profile of opening 23 is sized to accept inner side pad 13 in a position rotated from its final position. As shown in FIG. 7, inner side pad 13 is rotated (for purposes of installation) approximately 90° counter-clockwise from its final position indicated in FIG. 9.

Thus, for example, when inserting inner side pad 13 into cavity 12, mount 17, which becomes an upper mount in FIG. 1, is shown positioned on the left side in FIG. 7. Similarly, mount 19, which becomes a lower mount in FIG. 1, is shown positioned on the right side in FIG. 7. However, it should be understood that the position of each mount 17 and 19 is not limited to that shown in FIG. 7 for exemplary purposes.

Figure 8:
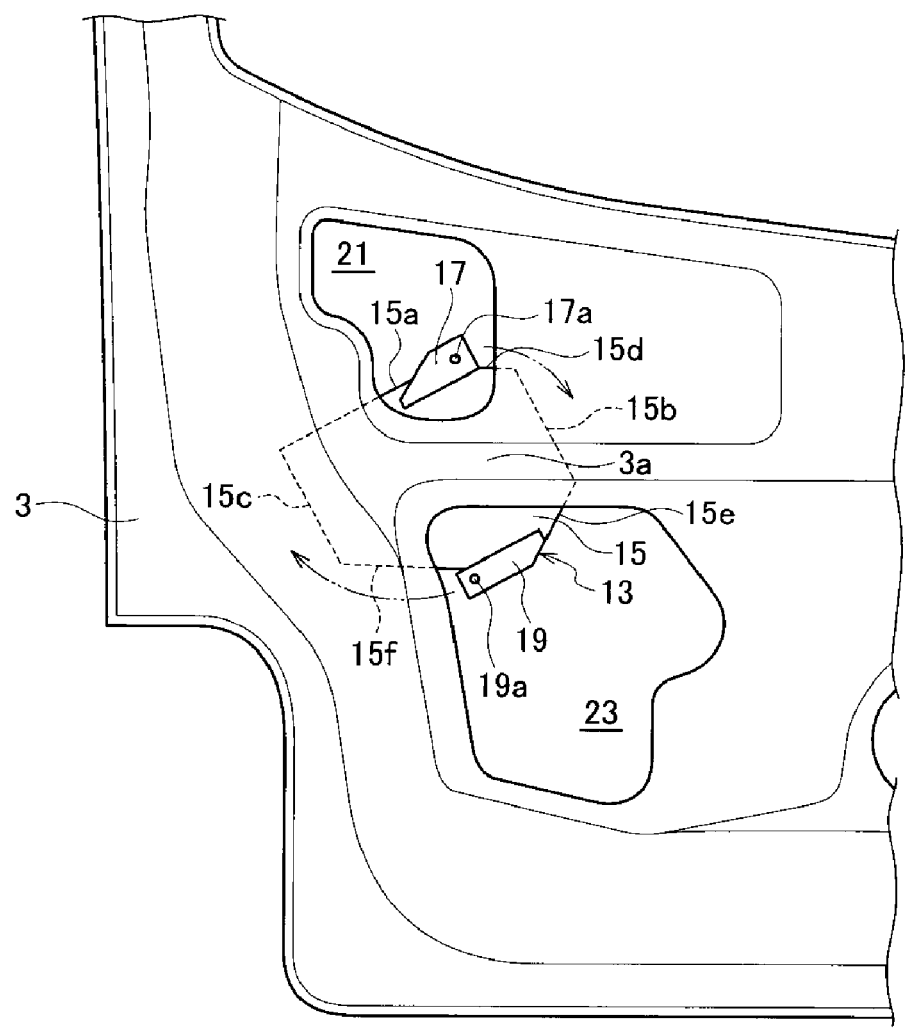
FIG. 8 is an explanatory view of an operation showing an intermediate state of moving the impact-absorbing member from the state shown in FIG. 7 to an opening at an upper portion of the vehicle side door.
Figure 9:
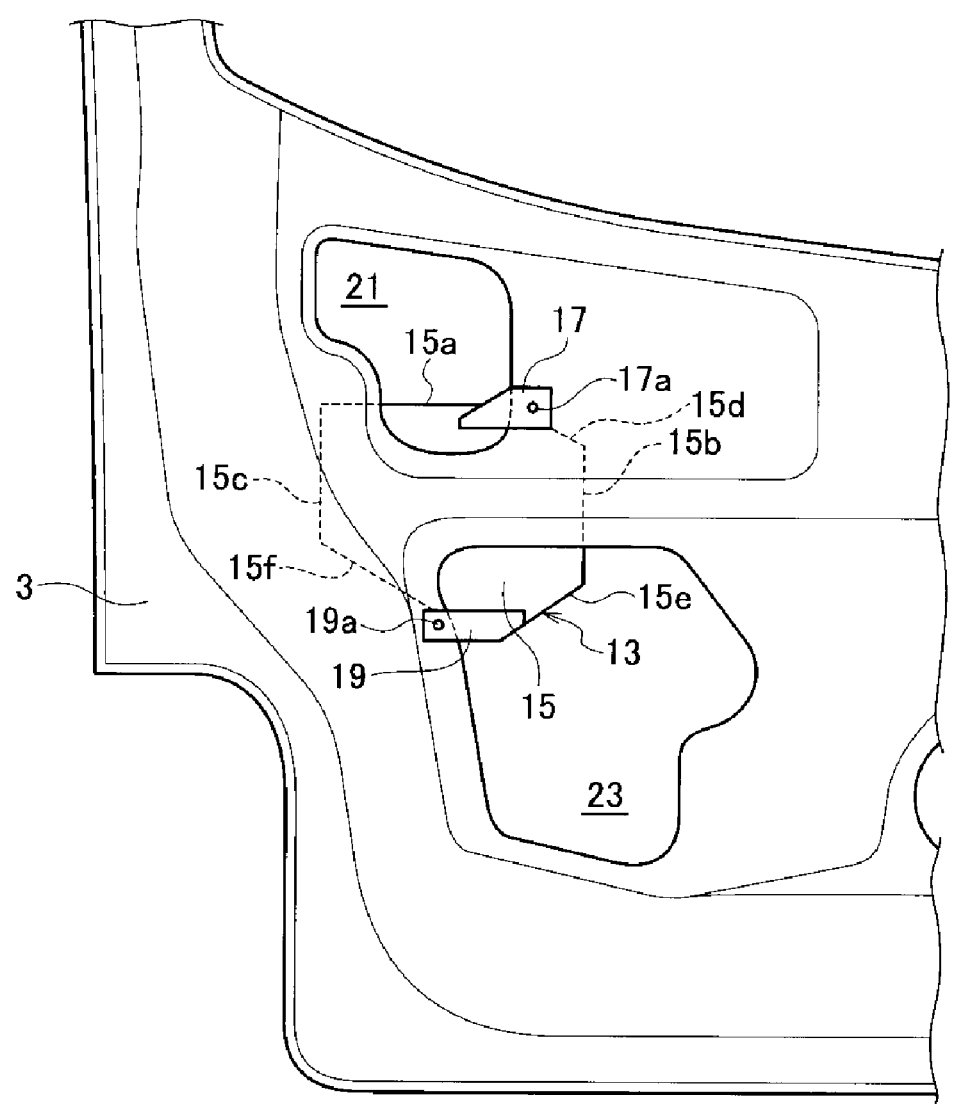
FIG. 9 is an explanatory view of an operation showing a final state of rotating the impact-absorbing member from the state shown in FIG. 8 to become locked in the inner panel of the vehicle side door.

Referring now to FIG. 8, inner side pad 13 is shown rotated in a clockwise direction while simultaneously moved toward opening 21 at the upper portion of inner panel 3. Thus, an approximate central position of main body 15 may be considered to be a position adjacent to a region 3a extending between openings 21 and 23 at upper and lower sides. Mounts 17 and 19 may be exposed to openings 21 and 23, respectively.

Further, when mounts 17 and 19 shown in FIG. 8 protrude from openings 21 and 23 toward an inboard side of outer panel 5 (i.e., in a direction into the plane of FIG. 8)), inner side pad 13 may be further rotated clockwise. Further, as shown in FIG. 9, each mount 17 and 19 may be positioned adjacent to an inboard side of inner panel 3.

Referring briefly now to FIGS. 5 and 6, the mounting of inner side pad 13 within inner panel 3 as shown in FIG. 9 may be described in more detail. Particularly, referring to FIG. 5, a gap S is formed on main body 15 between mount 17 and a surface 15g. Gap S may be sized such that inner panel 3 fits securely therein. It should be understood that mount 19 on lower portion of main body 15 may be similarly secured to inner panel 3.

In this state, inner side pad 13 may be held or locked in place within openings 21 and 23 so that it is temporarily retained and supported in inner panel 3. Furthermore, following the temporary retaining and supporting of inner side pad 13 to inner panel 3 as described above, mounts 17 and 19 may be permanently affixed to inner panel 3 by fasteners 29 and 31 as previously described and shown in FIGS. 1-6. As such, impact-absorbing inner side pad 13 may become fixed at the inner panel 3.

Further, it should be understood that impact-absorbing outer side pad 14 may be similarly mounted to outer panel 5 prior to the installation of inner side pad 13. As such, impact-absorbing inner side pad 13 mounted to inner panel 3 and impact-absorbing outer side pad 14 mounted to outer panel 5 may absorb forces of impact when a vehicle comprising the above-mentioned structure experiences a side surface crash or similar impact event. Thus, impact-absorbing inner side pad 13 (and outer side pad 14) may absorb the impact because its main body portion 15 is able to be elastically deformed.

As such, with reference to the mounting structure of impact-absorbing members disclosed in accordance in the above-described embodiment, as impact-absorbing pads 13 and 14 are able to be locked in openings 21 and 23 and temporarily retained and supported in the inner panel 3, it is no longer necessary to hold (or otherwise secure) them in place when installing fasteners 29 and 31. As such, the mounting operation may be simplified and performed more quickly than if pads 13 and 14 needed to be held into place while being fastened.

Further, in the above mounting operation, because the surface of main body 15 may be substantially parallel to the surface of inner panel 3 when impact-absorbing inner side pad 13 is inserted into opening 23, the size of opening 23 may be designed such that an inner peripheral edge of opening 23 is slightly larger than an outer peripheral edge of inner side pad 13. However, it should be understood that opening 23 may instead be sized smaller than inner side pad 13 so that a mounting operation may be accomplished by obliquely inserting impact-absorbing inner side pad 13 into opening 23.

As for opening 21 in the upper end of inner panel 3, the size of the opening 21 may be suitably established for the mount 17 in order to secure an area to move from the state shown in FIG. 8 to the state shown in FIG. 9. Further, it should be understood that the size of opening 21 may be even smaller than that shown in FIGS. 7-9 without adversely affecting the mounting operation.

As such, relatively large (e.g., volume) may be mounted even where the relative size of openings 21 and 23 are smaller than those in FIG. 7. Therefore, it may be possible to secure a desired impact-absorbing member without significant concern as to the sizes of openings 21 and 23.

Also, as shown in FIG. 7, inner panel 3 may include a cross-member 3a in the region between openings 21 and 23 extending longitudinally between the front and the rear portions of inner panel 3. As such, impact-absorbing inner side pad 13 may be located in a position corresponding to the longitudinal portion 3a.

Under former mounting schemes (as used in the prior art) where impact-absorbing members are merely pressed-in so that the member protrudes from the vehicle interior side of an inner panel toward the inboard side of an outer panel, it was necessary to remove the region 3a if the impact-absorbing member is to be located in the same position as shown in FIG. 1. As such, openings 21 and 23 would have to exist as a single continuous opening, thereby reducing the structural integrity and rigidity of inner panel 3.

Thus, according to the present embodiment, a condition may be established wherein a portion of main body 5 is adjacent to a surface (e.g., region 3a) at the outboard side of inner panel 3 between openings 21 and 23. As such, without reducing the structural integrity or rigidity of inner panel 3, impact-absorbing inner side pad 13 may be mounted at a desired position.

As such, the surface on the outboard side of region 3a, may be formed the same as the remainder of the outboard side of inner panel 3. Because it is not necessary for region 3a to protrude toward the outboard side, it may be possible to easily arrange inner side pad 13 in cavity 12 located between inner panel 3 and outer panel 5.

Further, because two mounts 17 and 19 protrude in opposite directions from main body 15 along a surface of inner panel 3, it may be possible to improve (i.e., increase) the force needed to temporarily retain and support inner side pad 13 against the inner panel 3 to facilitate the mounting operation.

Figure 10:
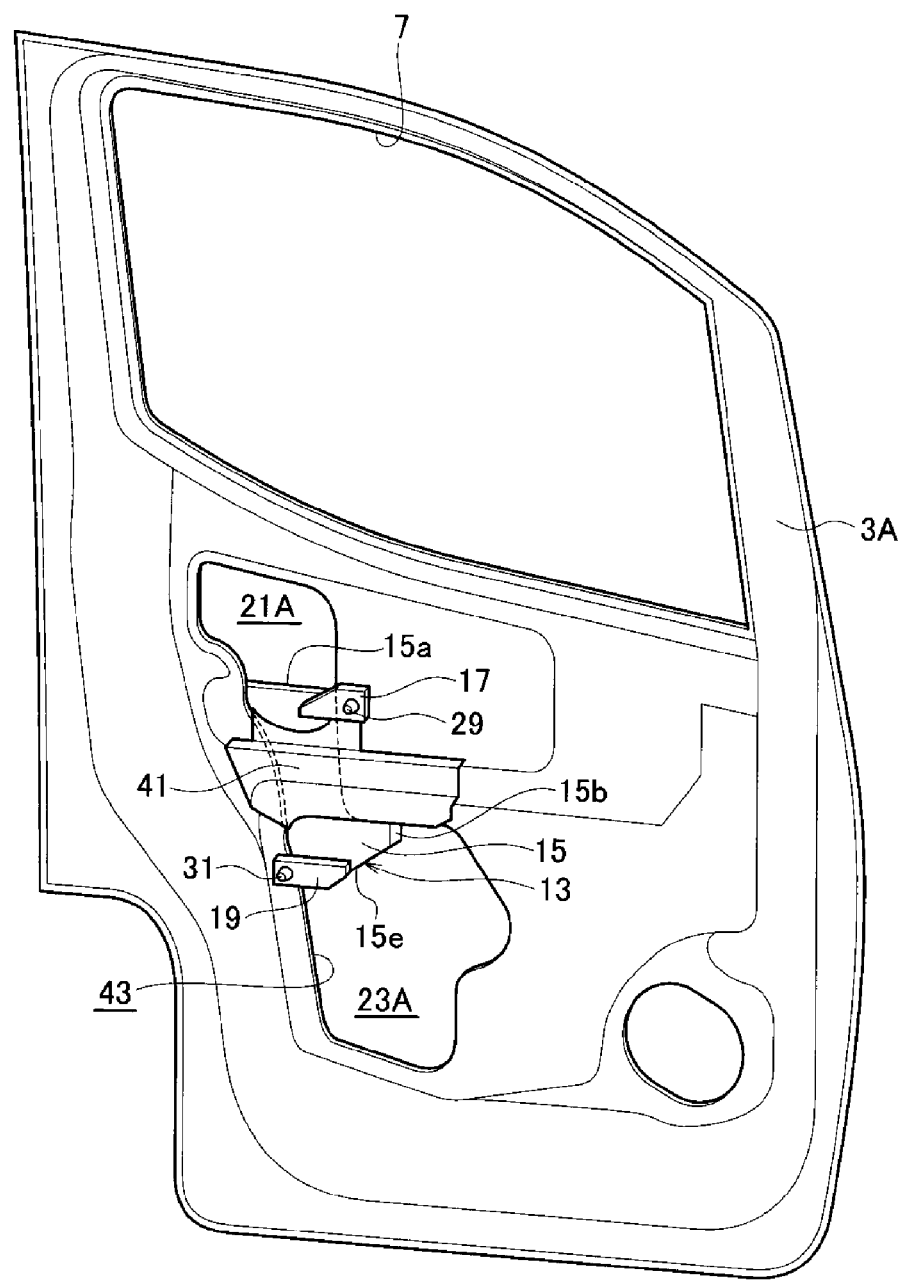
FIG. 10 is a perspective view of an inner panel viewed from a vehicle interior side in accordance with a first alternative embodiment of the present disclosure.

Referring now to FIG. 10, a perspective view of an alternative inner panel 3A when viewed from the vehicle interior side in accordance with a additional embodiment of the present disclosure is shown. Alternative inner panel 3A includes a reinforcing member 41 longitudinally extending where region 3a of inner panel 3 of FIGS. 1-9 was formerly located. As such, reinforcing member 41 may be installed integrally to the inner panel 3A by any fastening mechanism (e.g., screws, welds, rivets, etc.) known to those having ordinary skill. Aside from the replacement of region 3a with reinforcing member 41, inner panel 3A of FIG. 10 is substantially the same as inner panel 3 shown in FIG. 1.

That is, in the present embodiment, former openings 21 and 23 may be formed as a single continuous opening 43. Following installation of reinforcing member 41, two openings 21A and 23A are created in inner panel 3A.

Thus, because the shapes of openings 21A and 23A are changed only slightly from those of openings 21 and 23 shown in FIG. 1, impact-absorbing inner side pad 13 may be similarly sized to the one depicted in FIGS. 1-9. Further, a mounting method of the impact-absorbing inner side pad 13 on inner panel 3A may be performed substantially the same as in the first embodiment.

In the alternative embodiment as described above, in addition to achieving the same effects as in the first embodiment, the strength of the inner panel 3A may be increased by appropriately selecting the materials of the reinforcing member 41.

Further, the mounting operation may be performed by covering a separate reinforcing member on the region 3a between the opening portions 21 and 23 in the first embodiment.

Figure 11:
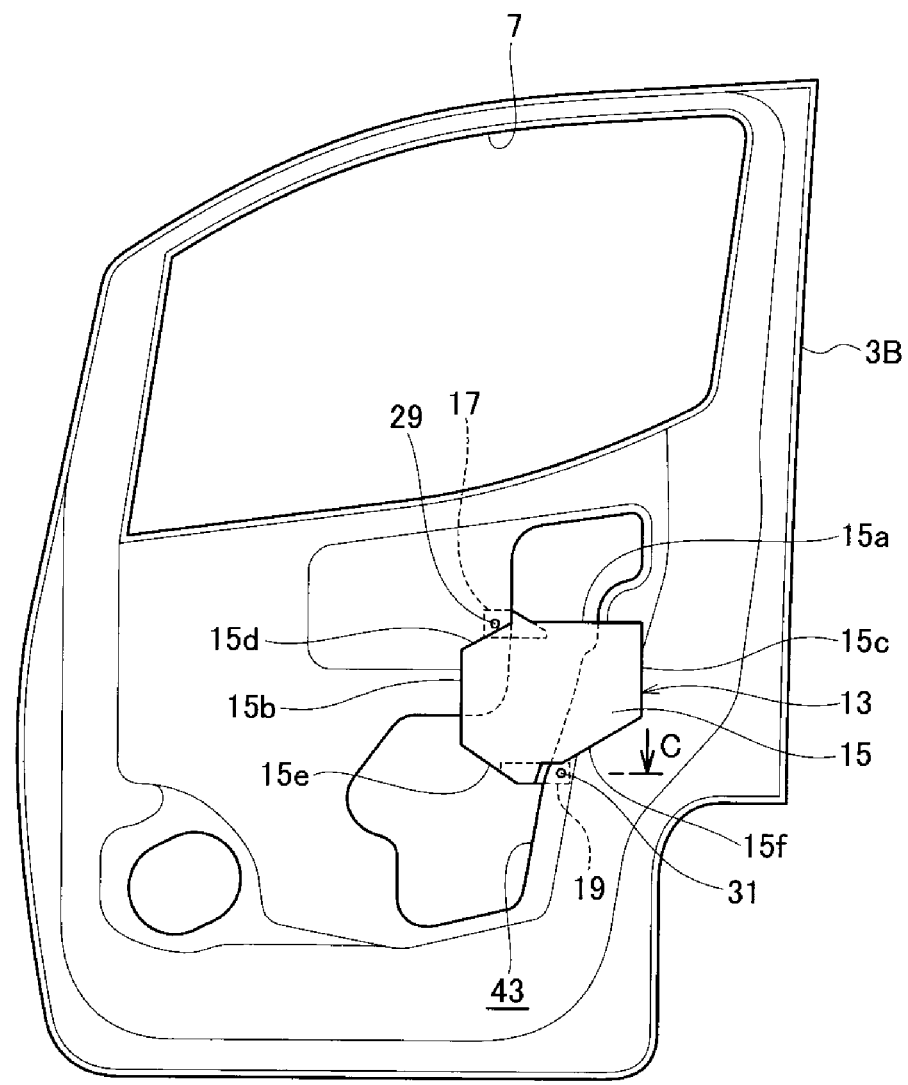
FIG. 11 is a front view of an inner panel viewed from a vehicle exterior side in accordance with a second alternative of the present disclosure.
Figure 12:
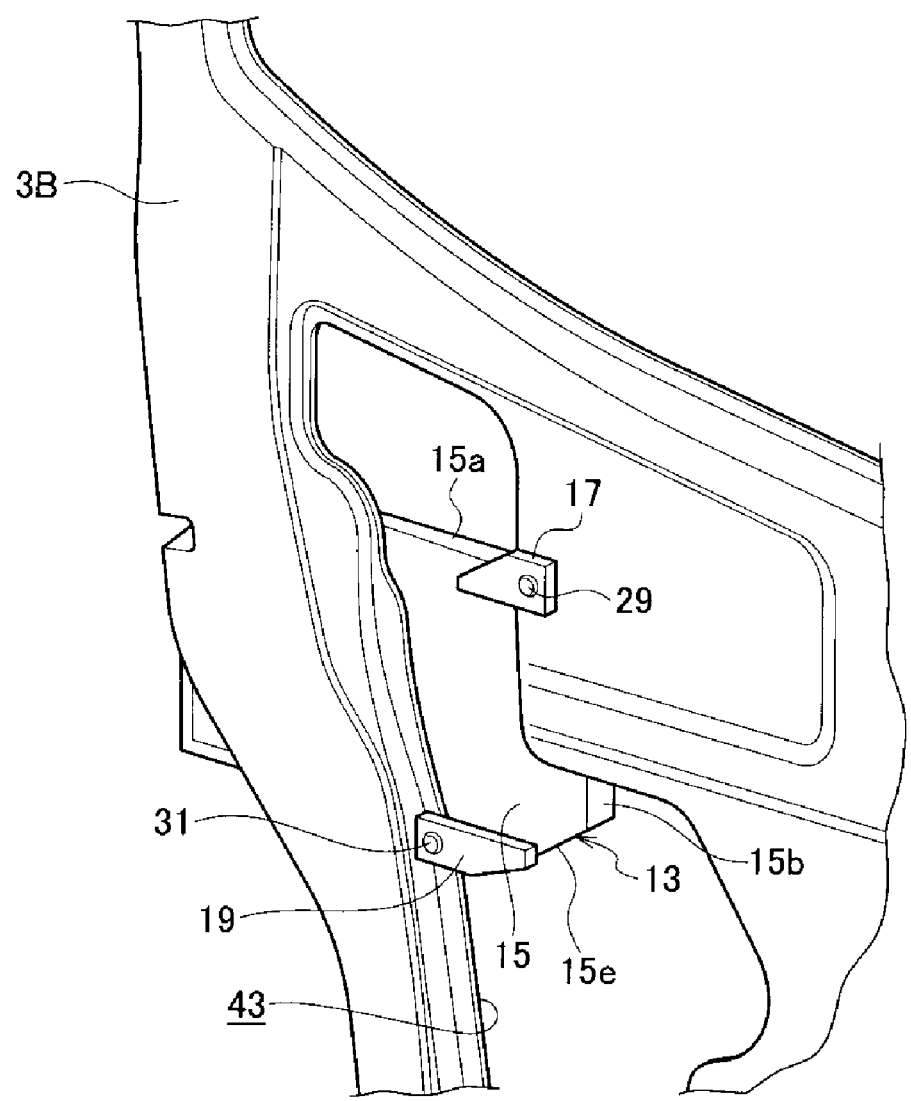
FIG. 12 is a perspective view of the inner panel of FIG. 11 viewed from the vehicle interior side.

Referring now to FIG. 11, a front view in accordance with a second alternative embodiment of the present disclosure 1 is shown. Similarly, FIG. 12 is a perspective view corresponding to FIG. 4. FIGS. 11 and 12 depict a second alternative inner panel 3B as viewed from an outboard side (i.e., from outside the vehicle with outer panel 5 removed) of the vehicle. As shown, inner panel 3B comprises a single opening 43 similar to inner panel 3A of FIG. 10 but without installing reinforcing member 41. Otherwise, inner panel 3B is substantially similar to inner panel 3 of FIGS. 1-9 and inner panel 3A of FIG. 10.

In the second alternative embodiment, impact-absorbing inner side pad 13 may be in the same shape as in each of the first and second embodiments and may mounted on inner panel 3B through a single opening 43. Further, the same mounting method as in the first embodiment shown in FIGS. 7 to 9 can be performed to install inner side pad 13 to inner panel 3B.

As shown, a portion of main body 15 of inner side pad 13 may be positioned adjacent to an outboard surface of inner panel 3B. Further as, inner panel 3B, does not include region 3a shown in the first embodiment or reinforcing member 41 of the first alternative embodiment, a portion of main body 15 of side pad 13 may be used to temporarily retain side pad 13 into inner panel 3B.

By adopting such a construction, when mounted on inner panel 3B as shown in FIG. 11, impact-absorbing inner side pad 13 is temporarily retained and supported in inner panel 3B by mounts 17 and 19 in addition to a portion of main body 15 extending between upper edge 15a, rear lower inclined edge 15f along rear edge 15c.

Further, in such a temporary retaining and supporting state, since fasteners 29 and 31 may be mounted to mounts 17 and 19 in the same manner as with the first embodiment, it is also not necessary to hold inner side pad 13 to prevent it from becoming detached from opening 43 when mounting fasteners 29 and 31. Thus, the mounting operation may be greatly facilitated.

Advantageously, using embodiments disclosed herein, it may not be necessary to apply force (outward, inward, etc.) to impact-absorbing members as they are being mounted with fasteners to inner panels. Particularly, impact-absorbing members disclosed herein may be secured in place by fitting them so that their main bodies and mounts grip and support the edges of openings in inner door panels. Thus, the mounting and installation of impact-absorbing members and their associated fasteners may be greatly facilitated.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. An impact-absorbing member to be installed in a vehicle body component, the impact-absorbing member comprising:
a main body positioned on an inner panel of the vehicle body component such that a portion of the main body is adjacent to an outboard surface of the inner panel and contacting the outboard surface of the inner panel at a first contacting portion; and
a mount protruding from the main body to an opening in the inner panel such that the mount is adjacent to an inboard surface of the inner panel and contacting with the inboard surface of the inner panel at a second contacting portion;
wherein the first contacting portion is apart from the second contacting portion in a vehicle vertical direction, and the impact-absorbing member is secured by gripping an edge portion of the inner panel surrounding the opening between the mount adjacent to the inboard surface and the portion of the main body adjacent to the outboard surface, and
wherein the main body overlaps a plurality of openings of the inner panel.

2. The impact-absorbing member of claim 1, further comprising:
a plurality of mounts protruding from the main body; and
wherein a portion of the main body is adjacent to an outboard surface inner panel at each opening.

3. The impact-absorbing member of claim 2, wherein two of the mounts protrude in differing directions from the main body along an inboard surface of the inner panel.

4. The impact-absorbing member of claim 1, wherein the mount is fixed from the inboard side of the inner panel by a fastener.

5. An impact-absorbing member to be installed in a vehicle body component, the impact-absorbing means comprising:
a body means positioned on an inner panel of the vehicle body component such that a portion of the body means is adjacent to an outboard surface of the inner panel and contacting the outboard surface of the inner panel at a first contacting portion; and
a mounting means protruding from the body means to an opening in the inner panel such that the mounting means is adjacent to an inboard surface of the inner panel and contacting with the inboard surface of the inner panel at a second contacting portion;
wherein the first contacting portion is apart from the second contacting portion in a vehicle vertical direction, and the impact-absorbing member is secured by gripping an edge portion of the inner panel surrounding the opening between the mounting means adjacent to the inboard surface and the portion of the body means adjacent to the outboard surface, and
wherein the main body means overlaps a plurality of openings of the inner panel.

6. The impact-absorbing member of claim 5, wherein the mounting means comprises two mounts protruding from the body means in differing directions.

7. The impact-absorbing member of claim 5, wherein the mounting means is fixed from the inboard side of the inner panel by fastening means.

8. An impact-absorbing member to be installed in an opening of an inner panel of a vehicle, the impact-absorbing member comprising:
a main body and a plurality of mounts protruding from the main body;
wherein the impact-absorbing member is configured to be secured to the opening by gripping an edge portion of the opening between a portion of the main body adjacent to an outboard side of the inner panel and the plurality of mounts protruding adjacent to an inboard side of the inner panel, and
wherein the portion of the main body adjacent to the outboard side contacts the inner panel at a first contacting portion and the mounts contact the inboard side of the inner panel at a second contacting portion, wherein the first contacting portion is apart from the second contacting portion in a vehicle vertical direction, and wherein the main body overlaps a plurality of openings of the inner panel.

9. The impact-absorbing member of claim 8, wherein the impact-absorbing member is secured to the plurality of openings by griping a plurality of edge portions with the portion of the main body and the plurality of mounts.

10. The impact-absorbing member of claim 8, wherein at least one of the plurality of mounts is fixed from the inboard side of the inner panel by a fastener.

11. The impact-absorbing member of claim 8, wherein at least two of the plurality of mounts protrude from the main body in differing directions.

* * * * *